United States Patent [19]
Waite et al.

[11] Patent Number: 5,413,003
[45] Date of Patent: May 9, 1995

[54] ATMOSPHERIC PRECIPITATION COLLECTOR AND METHOD OF EMPLOYING SAME

[75] Inventors: Donald T. Waite, Regina; James A. Banner, Saskatoon, both of Canada

[73] Assignee: Her Majesty the Queen in Right of Canada as represented by The Minister of the Environment, Hull, Canada

[21] Appl. No.: 144,449

[22] Filed: Nov. 2, 1993

[30] Foreign Application Priority Data

Nov. 4, 1992 [CA] Canada ................................. 2082113

[51] Int. Cl.⁶ .............................................. G01W 1/00
[52] U.S. Cl. ................................ 73/170.18; 73/863.23
[58] Field of Search ............ 73/170.17, 170.18, 863.21, 73/863.23

[56] References Cited

U.S. PATENT DOCUMENTS

| | | | |
|---|---|---|---|
| 2,699,679 | 1/1955 | Munger | 73/863.21 |
| 4,140,011 | 2/1979 | Krupa et al. | |
| 4,245,499 | 1/1981 | Nguyen et al. | |
| 4,600,888 | 7/1986 | Fukumoto et al. | 73/863.21 |
| 4,665,743 | 5/1987 | Masniere et al. | 73/170.17 |
| 4,766,465 | 8/1988 | Takahashi | |
| 5,048,331 | 9/1991 | Hattori et al. | 73/170.18 |
| 5,167,802 | 12/1992 | Sandstrom et al. | 73/863.21 |

*Primary Examiner*—Herbert Goldstein
*Assistant Examiner*—R. Biegel
*Attorney, Agent, or Firm*—McFadden, Fincham

[57] ABSTRACT

There is disclosed an apparatus and method for collection of both dry and wet precipitation. The invention involves the use of a dynamic flowing fluid surface for the collection of precipitation for temporary storage and subsequent analysis. The use of a dynamic system prevents exposure of the collected precipitation to other meteorological conditions which may alter, volatilize or destroy the precipitation material.

19 Claims, 2 Drawing Sheets

ATMOSPHERIC PRECIPITATION COLLECTOR AND METHOD OF EMPLOYING SAME

FIELD OF THE INVENTION

The present invention relates to an apparatus and method for collecting various types of precipitation and, more particularly, it relates to an apparatus and method for collecting environmental contaminants in the atmosphere from dust and rain.

BACKGROUND OF THE INVENTION

As environmental concerns continue to escalate, the need for a reliable and accurate method for precipitation sampling becomes more prominent, since data collected from this form of analysis is indicative of air quality among other factors.

Generally speaking, environmental contaminants are transported in the atmosphere and fall to the surface in rain and dust. To measure these it is necessary to capture dust fall and rain fall and analyze the precipitation for, inter alia, pesticides and organic contaminants.

Regarding the prior art in this field, U.S. Pat. No. 4,140,011, discloses an automatic precipitation sampler. The apparatus provides a precipitation receiving tray and a lid therefor. This apparatus does not provide a continuous closed circuit system employing a carrier fluid and accordingly, would not be useful for collecting dust precipitation.

U.S. Pat. No. 4,245,499, provides a rain sampler having a reservoir for storing rain therein and a funnel positioned on the top of the reservoir. This reference does not teach a system or method in which a moving carrier fluid is provided to effectively receive all forms of precipitation and trace organic contaminants therein.

In view of the absence of an apparatus and method for collecting precipitation of all varieties, there clearly exists a need for a system and method capable of achieving this need.

SUMMARY OF THE INVENTION

One object of the present invention is to provide an improved method for collecting precipitation.

Another object of the present invention is to provide an improved sampling system for sampling precipitation.

Another object of the present invention provides a method for collecting precipitation providing a sampling vessel having an inlet and an outlet for receiving precipitation therein; providing a reservoir containing a carrier fluid for transporting the precipitation passing the carrier fluid through the vessel; and collecting precipitation in the carrier fluid.

The provision of a dynamic closed circuit system is particularly advantageous for collecting precipitation since such an arrangement permits immediate removal of the precipitation from the sampling vessel. The result is that the precipitated material is not exposed to light, heat or other meteorological conditions which may degrade, vaporize or otherwise destroy the collected material.

The feature of immediate removal in the system is complemented by the collecting means for collecting material to be analyzed at a later date. In one form, the collection may be achieved by the use of a resin column, however, it will be appreciated that numerous other forms of suitable apparatus may be employed.

The method of employing a moving sheet of carrier fluid is particularly advantageous for collecting dust samples. The device, according to the present invention, collects falling dust rather than material floating in the atmosphere. This is important since what is "floating" does not usually compare with what falls to impact on water or soil surfaces.

By including a continuously flowing carrier fluid, the present invention can be used for the collection of both dry and wet e.g. snow, rain, precipitation.

In view of the fact that the apparatus according to the present invention is dual functioning, i.e. both dry and wet precipitation may be collected, the sampling vessel surface remains clean. This feature is particularly attractive when wet precipitation is collected and the vessel has been emptied of carrier fluid, since any precipitation collected remains devoid of extraneous contamination which would otherwise lead to imprecision in the analysis of the precipitation.

Depending upon the nature of the environment within which the apparatus is employed to collect precipitation, suitable modifications may be made. As an example, in regions having particularly low temperatures, suitable additives may be added to the carrier fluid to prevent freezing and heating means may be provided for the instrumentation and other elements of the apparatus. Similarly, hot and arid environments may require the use of a carrier fluid having a low volatility.

Modifications will depend on the situation and will be readily realized by those skilled in the art.

The method is effected by a novel apparatus which employs a sampling vessel specially configured to enhance the collection process.

A further object of the present invention is to provide a method for collecting precipitation comprising the steps of: providing a sampling vessel having an inlet and an outlet, the vessel for receiving precipitation therein; providing a reservoir containing a carrier fluid, the fluid for transporting the precipitation; passing the carrier fluid through the vessel; and collecting precipitation in the carrier fluid.

In a preferred form, the sampling vessel is at least slightly inclined from an outlet end to an inlet end in order to aid in the flowing of the carrier fluid.

As an additional feature, the vessel, according to one embodiment of the present invention, includes at least one crease in the base portion thereof; this has the advantage of concentrating the precipitated material along the crease, rather than having it, in the case of dust, collect in "pockets" or localized areas of the tray.

In another embodiment, the base includes, in the absence of the crease, a slot aperture extending transversely in the base relative to the longitudinal axis thereof.

A perforated tube is preferred for the dispensing of the carrier fluid at the inlet end of the sampling vessel.

The fluid reservoir may comprise any suitable container. The reservoir contains a supply of carrier fluid charged with precipitation. This fluid is recirculated through the system in order to maintain a constant and continuous flow in the system.

It will be readily apparent to those skilled in the art that numerous auxiliary components may be used with the apparatus of the present invention, including, for example, precipitation sensing devices, automatic covering devices, personal computers together with analytical instrumentation, in-line sampling valves, heating means, cooling means, etc.

In an alternate embodiment, the carrier fluid may be pumped via impulses rather than continuously.

As an additional embodiment, the sampling vessel, in place of the longitudinal crease, may include a drainage funnel at one end for receiving cascading carrier fluid into the reservoir.

Having thus generally described the present invention, reference will now be made to the accompanying drawings, illustrating preferred embodiments.

DETAILED DESCRIPTION OF THE PREFERRED EMBODIMENTS

Figure 1:
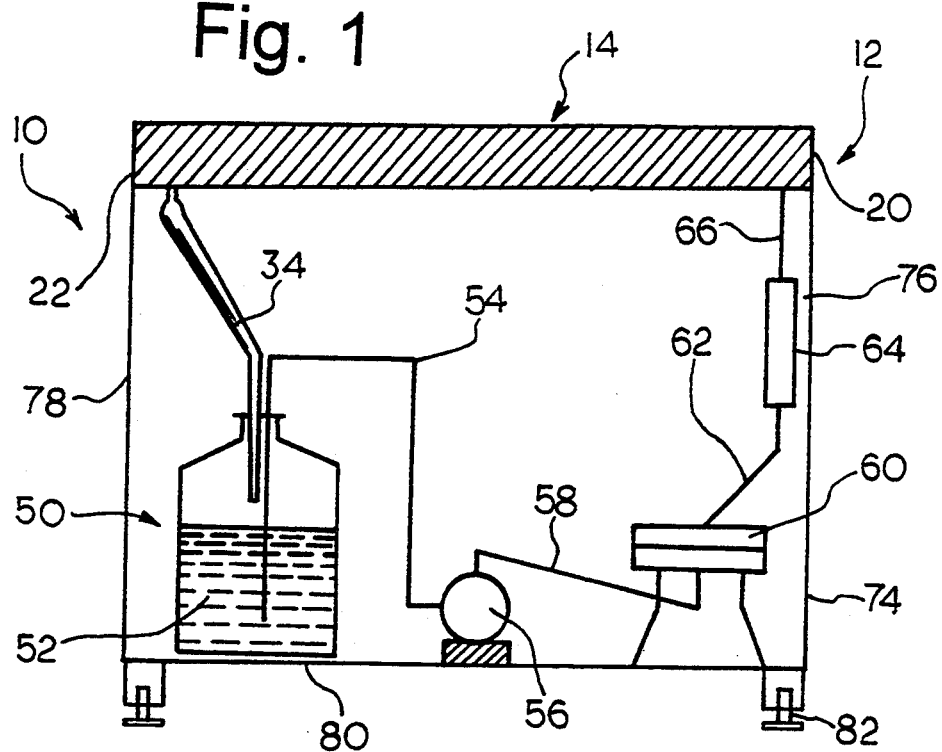
FIG. 1 is a side schematic representation of the apparatus of the present invention.

Referring now to the drawings, FIG. 1 illustrates the apparatus of the present invention, generally denoted by numeral 10.

Figure 2:
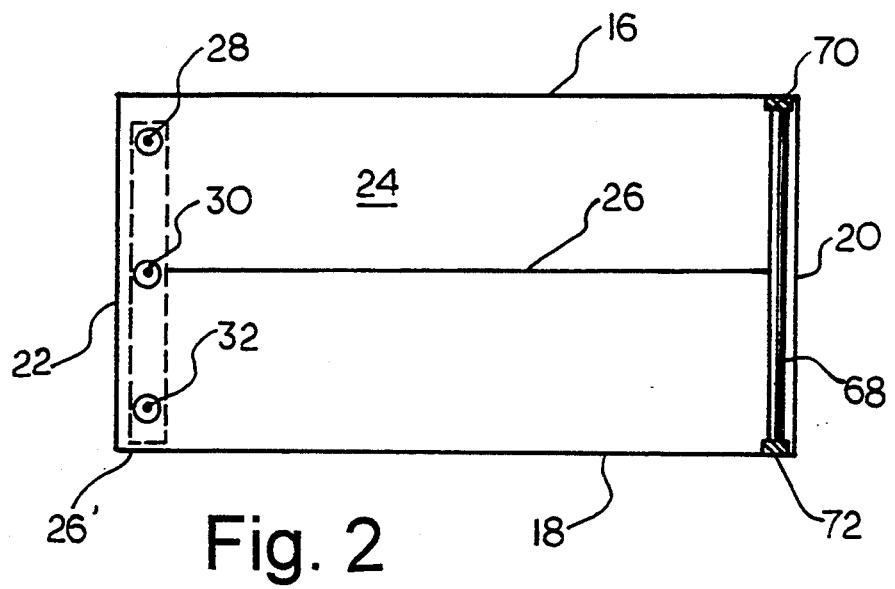
FIG. 2 is a top view of the sampling vessel of the apparatus illustrated in FIG. 1.

The sampling vessel 12, shown in plan view in FIG. 2, includes an open top 14, spaced apart sides 16 and 18 and opposed ends 20,22. A base 24 extends between sides 16,18 and ends 20,22. In the example, the sampling vessel 12 comprises stainless steel and includes a longitudinally extending crease 26 intermediate opposed sides 16 and 18.

End 22 of the sampling vessel 12 includes a plurality of openings 28 through 32, which function as drains for the vessel 12. These apertures drain fluid from within vessel 12 (discussed hereinafter). The openings preferably include screening means (not shown) for preventing passage of undesirable material into the system.

The fluid is drained via tubes 34 into reservoir 50.

The reservoir contains a supply of carrier fluid 52 which, in a preferred form, comprises deionized water for eventual passage into vessel 12. The reservoir, since the system is a closed circuit, includes dry precipitation products obtained from vessel 12.

A vacuum line 54 extends from within reservoir 50 to pump 56 and subsequently to a preliminary filtration stage 60 via line 58 extending from pump 56.

Optionally the apparatus may include a filtration stage 60 including a series of filter elements (not shown) for removing larger particulate material which is either not useful from an analysis point of view or which would have a deleterious effect on analysis equipment. Suitable filter means, e.g. filter paper, glass wool, electromagnetic precipitators, etc. may be included in this stage.

The carrier fluid is then passed, if this option is selected, from filter 60 to a collection means 64 via line 62. As will be readily apparent, this may comprise any one of a host of chemical collection arrangements, exemplary of which is a solvent extraction arrangement, resin column, etc. The choice of this element will, of course, depend on the nature of the material to be examined. In the example, the collection means comprises a resin column, removable from the system to extract the compounds of interest. The carrier fluid exits the column 64 via line 66 for passage into the inlet end 20 of vessel 12.

Line 66 is connected to a perforated tubular member 68 and includes a series of spaced apart apertures (not shown) on the undersurface thereof. The ends 70,72 of the tube 68 are capped to facilitate pressurized exit of the carrier fluid from the apertures.

The apparatus may be mounted to a cabinet 74 having a pair of opposed sides 76 and 78, the top portions of which mount vessel 12. A base 80 supports the apparatus and may include adjustable legs 82 to permit levelling adjustments of the apparatus.

The particular success of the present invention is attributed to the unique arrangement of elements and more particularly, the incorporation of the dynamic fluid flow in vessel 12. The perforated tubular nozzle 68 in combination with the crease 26 in vessel 12 provides for a continuously swept surface upon which precipitation may fall. The crease 26 has the effect at the fluid surface of concentrating particulate precipitation so that substantially all of the impinging dust material is delivered to the reservoir 80 and eventually the filtration stage 60; the positive inclination of vessel 12 from end 22 to end 20 additionally complements the directional flow.

Figure 3:
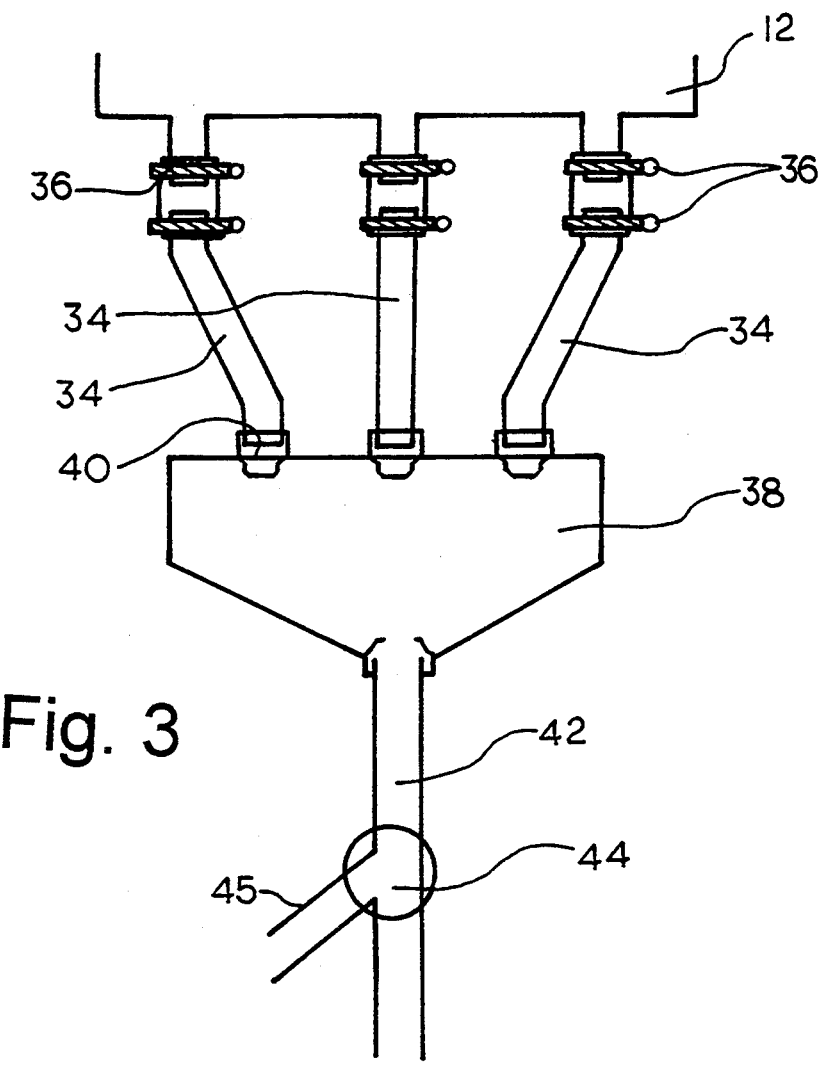
FIG. 3 is a schematic representation of a drainage system for use in the apparatus of the present invention.

In greater detail regarding tubes 34, FIG. 3 illustrates a view of the preferred arrangement of the drainage system. From end 22 of vessel 12, there is included a series of drain tubes 34 suitably clamped with clamps 36 to the undersurface of vessel 12 at apertures 28 through 32. The tubes 34 converge for drainage into a container 38 preferably formed of stainless steel. Suitable fittings 40 are connected to the tubes 34 for connection with container 38. Container 38 provides a drainage stem 42. A valve 44 is located at the juncture of a branch to facilitate flow of the fluid to the reservoir 50, where the dust and other particulate matter would settle, or to the fluid sampling components of the system, i.e. the filtration stage 60 and column 64.

The fluid sampling may be achieved by shutting down pump 56 which, in turn, eventually results in sampling vessel 12 being emptied at the onset of the liquid precipitation; this has the advantage of providing a clean and contaminant free surface onto which the precipitation may fall. Suitable sensing means (not shown) may be provided to effect the detection of the precipitation described hereinabove. The collected precipitation may then be passed onto a separate collection and/or filtration stage.

Laboratory testing of the precipitation sampler involved 10 μg (microgram) spikes of the compounds indicated in Table 1 to the carrier fluid. The table additionally provides recovery data.

TABLE 1

| Table 1: Pesticide recoveries from two fortified samples (one for herbicides, one for insecticides) added to the sampler and run for 5 days in water acidified with $H_2SO_4$.[1] | | |
|---|---|---|
| Pesticide | Spike (μg) | % Recovery |
| dicamba | 10 | 89 |
| bromoxynil | 10 | 101 |
| 2,4-D | 10 | 91 |
| trifluralin | 10 | 69 |
| triallate | 10 | 88 |
| diclofop methyl | 10 | 90 |
| MCPA | 10 | 86 |
| alachlor | 10 | 117 |
| metolachlor | 10 | 102 |
| atrazine | 10 | 95 |
| alpha HCH | 11 | 87 |
| gamma HCH | 7.1 | 95 |
| 4,4' DDE | 8.7 | 87 |
| 4,4' DDD | 9.7 | 97 |
| 4,4' DDT | 10.0 | 100 |

TABLE 1-continued

Table 1: Pesticide recoveries from two fortified samples (one for herbicides, one for insecticides) added to the sampler and run for 5 days in water acidified with $H_2SO_4$.[1]

| Pesticide | Spike (µg) | % Recovery |
| --- | --- | --- |
| toxaphene | 55.8 | 112 |

[1] Note that fortification levels are higher than those expected in environmental samples. Future work will include combined herbicide and insecticide fortifications at the 10, 1 and 0.1 µg levels.

The data illustrate good recovery for those compounds tested.

Referring now to Table 2, data are tabulated for field use of the collector.

TABLE 2

Table 2: Herbicides detected and confirmed by mass selective detector in two dry deposition samples collected in a one week period.

| Herbicide | Location 1 | Location 2 |
| --- | --- | --- |
| dicamba | x | nd |
| bromoxynil | x | x |
| 2,4-D | x | x |
| trifluralin | x | x |
| triallate | x | x |
| diclofop methyl | x | nd |
| MCPA | x | x |
| alachlor | nd | nd |
| metolachlor | nd | nd |
| atrazine | nd | nd | x = present
nd = not detected

In an alternate embodiment, as illustrated in dotted outline in FIG. 2, the sampling vessel 12, in the absence of crease 26, includes a slot 26' extending transversely of the vessel 12 relative to the longitudinal axis thereof in place of apertures 28, 30 and 32 and drain tube 34. The inclusion of the slot 26' allows the carrier fluid to cascade into container 38.

The apparatus 10 is capable of several modes of operation depending upon weather conditions.

During, for example, a rainstorm, rain sensors provides on the apparatus detect the rain and subsequently stop pump 56. In this manner, the rain collects in sampling vessel 12. In addition, valve 44 is closed, thus rerouting the rain collected in vessel 12 into branch 45 for collection in a second vessel (not shown).

Once the sensors detect cessation of the rain, the apparatus resumes normal operation as set forth herein previously.

Operation of the apparatus is possible at freezing temperatures by the provision of sampling vessel heaters, additives to the carrier fluid to depress the freezing point thereof, etc.

Further, operation of the apparatus may be achieved by remote control, or by making use of a modem or other suitable telecommunications device.

As is clearly evident from the foregoing, the apparatus and method of the present invention provide an extremely effective and highly accurate System for determining the chemical nature of precipitation and concomitant air quality.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A method for collecting precipitation comprising the steps of:
   providing a sampling vessel having an inlet and an outlet, said vessel for receiving precipitation therein;
   providing a reservoir containing a carrier fluid, said fluid for transporting said precipitation;
   passing said carrier fluid through said vessel; and
   collecting precipitation in said carrier fluid and recirculating said carrier fluid through said vessel.

2. The method as set forth in claim 1, wherein said carrier fluid is continuously passed through said vessel.

3. The method as set forth in claim 1, wherein said method is carried out in a dynamic and closed circuit.

4. The method as set forth in claim 1, further including the step of diverting at least a portion of precipitation loaded carrier fluid into a collection reservoir.

5. The method as set forth in claim 4, including the step of diverting at least a portion of precipitation loaded carrier fluid into a filtration step.

6. The method as set forth in claim 5, further including the step of passing said carrier fluid from said filtration stage to chemical collection means.

7. In a method for collecting precipitation in a sampling vessel, the improvement comprising:
   providing a source of fluid in said vessel;
   effecting flow of said fluid in said vessel to provide a moving fluid surface;
   collecting precipitation impinging on said moving fluid surface, and recirculating said fluid through said vessel.

8. The method as set forth in claim 7, wherein said fluid comprises deionized water.

9. The method as set forth in claim 7, wherein said method is carried out in a dynamic and closed circuit.

10. A sampling system for sampling precipitation comprising:
    a fluid reservoir for storing a carrier fluid, said carrier fluid for transporting said precipitation;
    a sampling vessel for receiving precipitation, said vessel being in fluid communication with said fluid reservoir for reception of said carrier fluid and discharge of precipitation therein;
    pump means for pumping said carrier fluid to said sample vessel; and means for recirculating said carrier fluid.

11. The system as set forth in claim 10, wherein said sampling system is a closed system.

12. The system as set forth in claim 10, wherein said system includes collection means for collecting chemical material contained in said precipitation.

13. The system as set forth in claim 12, wherein said collection means comprises a resin column.

14. The system as set forth in claim 10, wherein said sampling vessel includes an open top, opposed ends, opposed sides and a base extending between said ends and said sides, said base being angularly inclined from one end of said opposed ends to a second end of said opposed ends.

15. The system as set forth in claim 14, wherein said base includes a longitudinally crease.

16. The system as set forth in claim 12, wherein said system further includes at least one valve for diverting at least a portion of precipitation loaded carrier fluid to said resin column.

17. In a system for the collection of precipitation having a sampling vessel having an inlet and an outlet, the improvement wherein said system includes:

a source of carrier fluid for containing precipitation;

pump means for pumping said carrier fluid through said inlet of said vessel to provide a moving precipitation collection surface;

filter means for removing particulate precipitation from said carrier fluid containing precipitation and discharged from said outlet of said vessel;

chemical absorption means for absorbing fluid precipitation in said carrier fluid.

18. The system as set forth in claim 10 or 17, including sensing means for sensing precipitation.

19. A system as set forth in claim 17, wherein said system further includes means for recirculating said fluid.

* * * * *